United States Patent
Shimizu et al.

(10) Patent No.: US 9,783,879 B2
(45) Date of Patent: Oct. 10, 2017

(54) NITRIDED STEEL MEMBER AND MANUFACTURING METHOD THEREOF

(71) Applicants: DOWA THERMOTECH CO., LTD., Tokyo (JP); HONDA MOTOR CO., LTD., Tokyo (JP); NIPPON STEEL & SUMITOMO METAL CORPORATION, Tokyo (JP)

(72) Inventors: Yuichiro Shimizu, Tokyo (JP); Atsushi Kobayashi, Saitama (JP); Susumu Maeda, Saitama (JP); Masao Kanayama, Tokyo (JP); Hideki Imataka, Tokyo (JP); Masato Yuya, Tokyo (JP); Yuya Gyotoku, Tokyo (JP); Kiyotaka Akimoto, Tokyo (JP)

(73) Assignees: DOWA THERMOTECH CO., LTD., Tokyo (JP); HONDA MOTOR CO., LTD., Tokyo (JP); NIPPON STEEL & SUMITOMO METAL CORPORATION, Tokyo (JP)

( * ) Notice: Subject to any disclaimer, the term of this patent is extended or adjusted under 35 U.S.C. 154(b) by 416 days.

(21) Appl. No.: 14/394,423

(22) PCT Filed: Apr. 17, 2013

(86) PCT No.: PCT/JP2013/061396
§ 371 (c)(1),
(2) Date: Oct. 14, 2014

(87) PCT Pub. No.: WO2013/157579
PCT Pub. Date: Oct. 24, 2013

(65) Prior Publication Data
US 2015/0053311 A1   Feb. 26, 2015

(30) Foreign Application Priority Data

Apr. 18, 2012   (JP) ................................ 2012-095035

(51) Int. Cl.
| | |
|---|---|
| *C23C 8/26* | (2006.01) |
| *C21D 1/76* | (2006.01) |
| *C21D 9/32* | (2006.01) |
| *C21D 1/06* | (2006.01) |
| *C22C 38/24* | (2006.01) |
| *C21D 6/02* | (2006.01) |
| *C21D 9/28* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/22* | (2006.01) |
| *F16H 55/06* | (2006.01) |

(52) U.S. Cl.
CPC .................. *C23C 8/26* (2013.01); *C21D 1/06* (2013.01); *C21D 1/76* (2013.01); *C21D 6/02* (2013.01); *C21D 9/28* (2013.01); *C21D 9/32* (2013.01); *C22C 38/001* (2013.01); *C22C 38/002* (2013.01); *C22C 38/02* (2013.01); *C22C 38/04* (2013.01); *C22C 38/06* (2013.01); *C22C 38/22* (2013.01); *C22C 38/24* (2013.01); *C21D 2201/05* (2013.01); *C21D 2211/004* (2013.01); *C21D 2221/00* (2013.01); *F16H 55/06* (2013.01)

(58) Field of Classification Search
CPC .... C23C 8/26; C23C 8/32; C23C 8/50; C23C 8/56; C23C 8/76
See application file for complete search history.

(56) References Cited

U.S. PATENT DOCUMENTS

| 3,399,085 A | 8/1968 | Knechtel et al. |
|---|---|---|
| 2002/0162523 A1 | 11/2002 | Ishihara |
| 2009/0324825 A1 | 12/2009 | Evenson et al. |

FOREIGN PATENT DOCUMENTS

| JP | H05-070925 A | 3/1993 |
|---|---|---|
| JP | H06-033219 A | 2/1994 |
| JP | H11-072159 A | 3/1999 |

(Continued)

OTHER PUBLICATIONS

English Abstract and English Machine Translation of Imataka et al. (JP 2011-032537).*

(Continued)

*Primary Examiner* — Jessee Roe
(74) *Attorney, Agent, or Firm* — Michael Best & Friedrich LLP (57) ABSTRACT

A nitrided steel member including an iron nitride compound layer formed on a surface of a steel member having predetermined components, wherein: in X-ray diffraction peak intensity IFe$_4$N (111) of a (111) crystal plane of Fe$_4$N and X-ray diffraction peak intensity IFe$_3$N (111) of a (111) crystal plane of Fe$_3$N, which are measured on a surface of the nitrided steel member by X-ray diffraction, an intensity ratio expressed by IFe$_4$N (111)/{IFe$_4$N (111)+IFe$_3$N (111)} is 0.5 or more; Vickers hardness of the iron nitride compound layer is 900 or less, Vickers hardness of a base metal immediately under the iron nitride compound layer is 700 or more, and a difference between the Vickers hardness of the iron nitride compound layer and the Vickers hardness of the base metal is 150 or less; and a thickness of the iron nitride compound layer is 2 to 17 μm.

4 Claims, 4 Drawing Sheets

(56) References Cited

FOREIGN PATENT DOCUMENTS

| JP | 2002-097563 | A | | 4/2002 |
|---|---|---|---|---|
| JP | 2006-028588 | A | | 2/2006 |
| JP | 2006-225741 | A | | 8/2006 |
| JP | 2011-032537 | | * | 2/2011 |

OTHER PUBLICATIONS

Office Action issued in Chinese Application No. 201380020718.0, dated Dec. 4, 2015.
Hisahiko Yamanaka, "Chikkaso no Kaiseki", ION Chikkaho, First Edition, Jul. 10, 1976, p. 70, 71, 79 &141 (4 pages), The Nikkan Kogyo Shinbun, Ltd., Japan.
International Search Report issued in Application No. PCT/JP2013/061396, mailed Jun. 18, 2013.

* cited by examiner

NITRIDED STEEL MEMBER AND MANUFACTURING METHOD THEREOF

TECHNICAL FIELD

The present invention relates to a nitrided steel member whose surface is nitrided by a nitriding treatment in a gas atmosphere and to a manufacturing method thereof. It further relates to a high-strength nitrided steel member that is used as a gear of an automobile or the like and has improved pitting resistance and bending fatigue strength.

BACKGROUND ART

A gear that is used in, for example, a transmission for an automobile is required to have high pitting resistance and bending fatigue strength. In order to meet such a requirement, a carburizing treatment has conventionally been widely performed as a method of strengthening a steel member such as a gear. Further, with the aim of further improving the pitting resistance, there has been proposed an invention relating to achievement of high strength by a carbonitriding treatment (Patent Document 1). On the other hand, in a planetary gear, due to its high engagement degree, tooth profile accuracy (strain) has a great influence on gear noise. Especially in an internal gear, there has been a problem in that it is likely to be strained because it is thin and large in diameter. Under such circumstances, there has also been proposed an invention relating to a gas nitrocarburizing treatment which causes a steel member to strain little and also causes only a small strain variation (Patent Document 2).

PRIOR ART DOCUMENT

Patent Document

[Patent Document 1] Japanese Laid-open Patent Publication No. H 5-70925
[Patent Document 2] Japanese Laid-open Patent Publication No. H 11-72159

DISCLOSURE OF THE INVENTION

Problems to be Solved by the Invention

A steel member whose strength is increased by a gas nitrocarburizing treatment is small in strain amount and strain variation but is inferior in fatigue strength such as pitting resistance and bending fatigue strength as compared with a steel member whose strength is increased by carburizing or carbonitriding.

Further, a high-strength carbonitrided member produced by the carbonitriding described in Patent Document 1 has a problem of low bending fatigue strength even though its pitting resistance is higher than that of a carburized member. It also has a problem that a strain amount is increased because it is heat-treated in an austenite transformation temperature range of steel. Further, it has a problem that strain variation is large in a lot and among lots because a hardening process is essential for carburizing and carbonitriding treatments.

Further, in a nitrided member having undergone the gas nitrocarburizing treatment described in Patent Document 2 or the like, by thinning a compound layer, pitting resistance (problem that the compound layer on the uppermost surface peels off) is improved as compared with a compound layer obtained by a conventional gas nitrocarburizing treatment, but is inferior as compared with one having undergone a carburizing treatment.

It is an object of the present invention to provide a high-strength, low-strain nitrided steel member having high pitting resistance and bending fatigue strength and further having low strain as compared with one having undergone a carburizing or carbonitriding treatment, and to provide a manufacturing method thereof Means for Solving the Problems As a result of studious studies for solving the above-described problems, the prevent inventors have found out that, by generating an iron nitride compound layer having a predetermined structure on a surface of a steel member having a predetermined composition, it is possible to obtain a high-strength, low-strain nitrided steel member having low strain and having excellent pitting resistance and bending fatigue strength, and have finally completed the present invention.

The present invention is a nitrided steel member including an iron nitride compound layer formed on a surface of a steel member which contains, by mass %, C: 0.05 to 0.14%, Si: 0.10 to 0.30%, Mn: 0.4 to 1.4%, Cr: 0.9 to 1.9%, Mo: 0 to 0.50%, V: 0 to 0.40%, Al: 0.01 to 0.14%, and S: 0.005 to 0.030%, whose Hs value expressed by the following expression 1 is 1.19 or more, whose Hc value expressed by the following expression 2 is 3.76 or less, and in which the balance is made of Fe and impurities, with P, N, and O in the impurities being P: 0.030% or less, N: 0.008% or less, and O: 0.0030% or less, wherein, in X-ray diffraction peak intensity IFe$_4$N (111) of a (111) crystal plane of Fe$_4$N and X-ray diffraction peak intensity IFe$_3$N (111) of a (111) crystal plane of Fe$_3$N, which are measured on a surface of the nitrided steel member by X-ray diffraction, an intensity ratio expressed by IFe$_4$N (111)/{IFe$_4$N (111)+IFe$_3$N (111)} is 0.5 or more, wherein Vickers hardness of the iron nitride compound layer is 900 or less, Vickers hardness of a base metal immediately under the iron nitride compound layer is 700 or more, and a difference between the Vickers hardness of the iron nitride compound layer and the Vickers hardness of the base metal is 150 or less, and wherein a thickness of the iron nitride compound layer is 2 to 17 μm.

$$Hs\ \text{value}=(-342.1\times C+23.5\times Mn+125.0\times Cr+14.4\times Mo+208.3\times V+346.4\times Al)/100 \qquad \text{expression 1}$$

In the expression 1, C, Mn, Cr, Mo, V, and Al represent values of mass % of the respective elements.

$$Hc\ \text{value}=(156.1\times C+54.7\times Mn+158.4\times Cr+146.5\times Mo+33.8\times V+418.6\times Al)/100 \qquad \text{expression 2}$$

In the expression 2, C, Mn, Cr, Mo, V, and Al represent values of mass % of the respective elements.

The nitrided steel member of the present invention is preferably a gear used in a transmission.

Further, the present invention is a manufacturing method of a nitrided steel member, the method including applying a nitriding treatment to a steel member in an atmosphere of nitriding treatment gas in which a ratio of a partial pressure of NH$_3$ gas is 0.08 to 0.34, a ratio of a partial pressure of H$_2$ gas is 0.54 to 0.82, and a ratio of a partial pressure of N$_2$ gas is 0.09 to 0.18 when a total pressure is defined as 1, with a flow velocity of the nitriding treatment gas on a surface of the steel member being set to 1 m/s or more, and with a temperature being set to 500 to 620° C., to thereby form an iron nitride compound layer with a 2 to 17 μm thickness on the surface of the steel member, the steel member being a member which contains, by mass %, C: 0.05 to 0.14%, Si: 0.10 to 0.30%, Mn: 0.4 to 1.4%, Cr: 0.9 to 1.9%, Mo: 0 to 0.50%, V: 0 to 0.40%, Al: 0.01 to 0.14%, and S: 0.005 to 0.030%, whose Hs value expressed by the following expression 1 is 1.19 or more, whose Hc value expressed by the following expression 2 is 3.76 or less, and in which the balance is made of Fe and impurities, with P, N, and O in the impurities being P: 0.030% or less, N: 0.008% or less, and O: 0.0030% or less.

$$Hs \text{ value} = (-342.1 \times C + 23.5 \times Mn + 125.0 \times Cr + 14.4 \times Mo + 208.3 \times V + 346.4 \times Al)/100 \qquad \text{expression 1}$$

In the expression 1, C, Mn, Cr, Mo, V, and Al represent values of mass % of the respective elements.

$$Hc \text{ value} = (156.1 \times C + 54.7 \times Mn + 158.4 \times Cr + 146.5 \times Mo + 33.8 \times V + 418.6 \times Al)/100 \qquad \text{expression 2}$$

In the expression 2, C, Mn, Cr, Mo, V, and Al represent values of mass % of the respective elements.

A time of the nitriding treatment may be within a range over 0.5 hours and less than ten hours.

Note that, in the present description, the "iron nitride compound layer" refers to a nitride compound of iron typified by a $\gamma'$ phase-$Fe_4N$ or an $\epsilon$ phase-$Fe_{2-3}N$ formed on the surface of the steel member by the nitriding treatment in the gas atmosphere.

Effect of the Invention

According to the present invention, it is possible to provide a nitrided steel member having excellent pitting resistance and bending fatigue strength equivalent to or higher than those of a member having undergone a carburizing treatment, and further has low strain as compared with one having undergone a carburizing or carbonitriding treatment.

MODE FOR CARRYING OUT THE INVENTION

Hereinafter, a nitrided steel member according to the present invention and a manufacturing method thereof will be described in detail with reference to the drawings.

The nitrided steel member of the present invention has an iron nitride compound layer having a $\gamma'$ phase as its main component, on a surface of a steel member (base metal) having a predetermined composition.

The steel member (base metal) of the present invention contains, by mass %, C: 0.05 to 0.14%, Si: 0.10 to 0.30%, Mn: 0.4 to 1.4%, Cr: 0.9 to 1.9%, Mo: 0 to 0.50%, V: 0 to 0.40%, Al: 0.01 to 0.14%, and S: 0.005 to 0.030%, and the balance being Fe and impurities.

C: 0.05 to 0.14%

C is an element essential for ensuring strength of a nitrided component and its content needs to be 0.05% or more. However, when the content of C becomes high to be over 0.14%, hardness before the nitriding becomes high, leading to deterioration in machinability. Therefore, the content of C is set to 0.05 to 0.14%. In order to more stably ensure the strength of the nitrided component, the content of C is preferably 0.09% or more. Further, when machinability is given a higher importance, the content of C is preferably 0.13% or less.

Si: 0.10 to 0.30%

Si has a deoxidation action. In order to obtain this effect, the content of Si needs to be 0.10% or more. However, when the content of Si becomes high to be over 0.30%, hardness before the nitriding becomes high, leading to deterioration in machinability. Therefore, the content of Si is set to 0.10 to 0.30%. The content of Si is preferably 0.12% or more, and is preferably 0.25% or less.

Mn: 0.4 to 1.4%

Mn has an action for ensuring pitting resistance and bending fatigue strength of the nitrided component and also has a deoxidation action. In order to obtain these effects, its content needs to be 0.4% or more. However, when the content of Mn becomes high to be over 1.4%, hardness before the nitriding becomes too high, leading to deterioration in machinability. Therefore, the content of Mn is set to 0.4 to 1.4%. In order to more stably ensure strength of the nitrided component, the content of Mn is preferably 0.5% or more. Further, when machinability is given a higher importance, the content of Mn is preferably 1.3% or less.

Cr: 0.9 to 1.9%

Cr has an action to increase surface hardness and core hardness in the nitriding and ensure pitting resistance and bending fatigue strength of the component. However, when the content of Cr is less than 0.9%, the above effects cannot be obtained. On the other hand, when the content of Cr becomes high to be over 1.9%, hardness before the nitriding becomes high, leading to deterioration in machinability. Therefore, the content of Cr is set to 0.9 to 1.9%. In order to more stably increase surface hardness and core hardness in the nitriding, the content of Cr is preferably 1.1% or more. Further, when machinability is given a higher importance, the content of Cr is preferably 1.4% or less.

Mo: 0 to 0.50% (including 0%)

Mo need not be contained. When Mo is contained, Mo bonds with C in steel at a nitriding temperature to form a carbide, and accordingly core harness after the nitriding improves. However, when the content of Mo becomes high to be over 0.50%, not only a raw material cost increases but also hardness before the nitriding becomes high, leading to deterioration in machinability. Therefore, the content of Mo is set to 0.50% or less. When machinability is given a higher importance, the content of Mo is preferably 0.40% or less.

V: 0 to 0.40% (including 0%)

V need not be contained. When V is contained, V, similarly to Mo, bonds with C in the steel at the nitriding temperature to form a carbide and accordingly has an action to improve core hardness after the nitriding. Further, it bonds with N and C entering and diffusing from a surface at the time of the nitriding to form a nitride or a carbonitride and accordingly also has an action to improve surface hardness. When the content of V becomes high to be over 0.40%, hardness before the nitriding becomes too high, leading to deterioration in machinability, and in addition, V is not solid-dissolved in a matrix in hot forging and subsequent normalizing, so that the aforesaid effects saturate. Therefore, the content of V is set to 0 to 0.40%. The content of V is preferably 0.15% or more and is preferably 0.20% or less.

Al: 0.01 to 0.14%

Al has a deoxidation action. Further, it bonds with N entering and diffusing from the surface at the time of the nitriding to form AlN and accordingly has an action to improve surface hardness. In order to obtain these effects, the content of Al needs to be 0.01% or more. However, when the content of Al becomes high to be over 0.14%, it forms hard $Al_2O_3$, leading to deterioration in machinability, and in addition, there occurs a problem that a hardened layer in the nitriding becomes shallow, leading to deterioration in pitting resistance and bending fatigue strength. Therefore, the content of Al is set to not less than 0.01% nor more than 0.14%. A preferable lower limit of the Al content is 0.02%, and a preferable upper limit thereof is 0.07%.

S: 0.005 to 0.030%

S bonds with Mn to form MnS and accordingly has an action to improve machinability. However, when the content of S is less than 0.005%, the above effect is difficult to obtain. On the other hand, when the content of S is over 0.030%, coarse MnS is formed, leading to deterioration in hot forgeability and bending fatigue strength. Therefore, the content of S is set to 0.005 to 0.030%. In order to more stably ensure machinability, the content of S is preferably 0.010% or more. Further, when hot forgeability and bending fatigue strength are given a higher importance, the content of S is preferably 0.025% or less.

Hs value: 1.19 or more

An Hs value is an index indicating hardness of the base metal immediately under the iron nitride compound layer after the nitriding treatment. In order to obtain surface hardness that the nitrided steel member needs to have, in solid-solution strengthening by N and precipitation strengthening by an alloy nitride, the Hs value expressed by the following expression 1 needs to be 1.19 or more.

$$Hs \text{ value}=(-342.1 \times C+23.5 \times Mn+125.0 \times Cr+14.4 \times Mo+208.3 \times V+346.4 \times Al)/100 \quad \text{expression 1}$$

In the expression 1, C, Mn, Cr, Mo, V, and Al represent values of mass % of the respective elements.

Hc value: 3.76 or less

The Hc value is an index indicating hardness of the iron nitride compound layer. In order to avoid deterioration in fatigue strength and deterioration in a peeling property of the iron nitride compound layer, the Hc value needs to be 3.76 or less.

$$Hc \text{ value}=(156.1 \times C+54.7 \times Mn+158.4 \times Cr+146.5 \times Mo+33.8 \times V+418.6 \times Al)/100 \quad \text{expression 2}$$

In the expression 2, C, Mn, Cr, Mo, V, and Al represent values of mass % of the respective elements.

The present invention has a chemical composition including the aforesaid elements and the balance being Fe and impurities. Note that the "Fe and impurities" as the balance refer to, for example, Cu, Ni, and Ti unavoidably mixed from an ore as a raw material when a steel material is industrially manufactured, or, for example, O (oxygen) or the like unavoidably mixed from a manufacturing environment.

However, in the present invention, it is necessary to especially strictly limit P, N, and O in the impurities, and they need to be set, by mass %, as follows. P: 0.030% or less, N: 0.008% or less, and O: 0.0030% or less. Hereinafter, P, N, and O in the impurities will be described.

P: 0.030% or less

P is an impurity contained in the steel, segregates in a crystal grain boundary to make the steel brittle, and especially when its content is over 0.030%, a degree of the embrittlement sometimes becomes great. Therefore, in the present invention, the content of P in the impurities is set to 0.030% or less. Note that the content of P in the impurities is preferably 0.020% or less.

N: 0.008% or less

N in the steel bonds with elements such as C and V to be likely to form a carbonitride, and when a carbonitride such as VCN is formed before the nitriding, hardness becomes high, leading to deterioration in machinability, and therefore, N is an undesirable element in the present invention. Further, this carbonitride has a high solid-solution temperature, and therefore, V is not easily solid-dissolved in the matrix in heating in the hot forging and in the subsequent normalizing, and therefore, when the N content in the steel is high, the aforesaid effects of V by the nitriding are not sufficiently obtained. Therefore, in the present invention, the content of N in the impurities is set to 0.008% or less. Note that the content of N in the impurities is preferably 0.006% or less.

O: 0.0030% or less

O forms an oxide-based inclusion that causes a fatigue failure starting from the inclusion, to lower pitting resistance and bending fatigue strength. Especially when the content of O is over 0.0030%, the aforesaid deterioration in fatigue strength becomes great. Therefore, in the present invention, the content of O in the impurities is set to 0.0030% or less. Note that the content of O in the impurities is preferably 0.0020% or less.

By applying a later-described nitriding treatment to such a steel member, it is possible to easily obtain a steel member in which Vickers hardness of the iron nitride compound layer is 900 or less, Vickers hardness of the base metal immediately under the iron nitride compound layer is 700 or more, and a difference between the both is 150 or less. When the Vickers hardness of the iron nitride compound layer is over 900, conformability is lost and minute ruggedness occurring due to machining remains, and thus a local stress becomes high, and an improvement in fatigue strength cannot be expected. Further, when the Vickers hardness of the base metal immediately under the iron nitride compound layer is less than 700, a hardness difference from the iron nitride compound layer becomes large, so that peeling is likely to occur, and after the the iron nitride compound layer disappears due to abrasion, abrasion of the exposed base metal rapidly progresses, so that sound and vibration become worse and damage occurs because a gear profile gets worse. On the other hand, when the hardness difference between the both is 150 or more, peeling is likely to occur from a boundary portion and an improvement in fatigue strength cannot be expected.

Note that, in the present invention, the "iron nitride compound layer" refers to a nitride compound of iron typified by a γ' phase-$Fe_4N$ and an ε phase-$Fe_{2-3}N$ formed on the surface of the steel member by a gas nitrocarburizing treatment. The iron nitride compound layer is the γ' phase or the ε phase and is precipitated as a layer state. In the present invention, on the surface of the steel member (base metal), the iron nitride compound layer made of these γ' phase and ε phase is formed with a thickness within a 2 to 17 μm range. On the other hand, the steel member (base metal) is made of the steel having the previously described predetermined component range, but immediately under the iron nitride compound layer (in the steel member (base metal) at a position in contact with a boundary surface between the iron nitride compound layer and the steel member (base metal)), a fine alloy carbonitride is coherently precipitated in the steel. Immediately under the iron nitride compound layer, since the alloy carbonitride is thus precipitated, hardness is high as compared with a base metal core.

On the surface of the nitrided steel member of the present invention, the iron nitride compound layer having the γ' phase as the main component is formed by applying the nitriding treatment to the steel member in the gas atmosphere. Further, the thickness of the iron nitride compound layer is 2 to 17 μm. When the thickness of the iron nitride compound layer is less than 2 μm, it is too thin and the improvement in fatigue strength is thought to be limited. On the other hand, when the thickness of the iron nitride compound layer is over 17 μm, a ratio of the ε phase increases because a diffusion speed of nitrogen in the γ' phase is low and the nitrogen concentration of the iron nitride compound layer increases as the thickness increases. As a result, since the whole iron nitride compound layer becomes brittle, the peeling is likely to occur and thus the improvement in fatigue strength cannot be expected. Considering the aforesaid reasons and variation of film thickness at the time of mass production, the thickness of the iron nitride compound layer is more preferably 4 to 16 μm.

A possible reason why pitting resistance and bending fatigue strength of the nitrided steel member of the present invention are excellent is as follows. Since a crystal structure of the γ' phase is FCC (face-centered cubic) and has twelve slip systems, the crystal structure itself is rich in toughness. Further, a fine equiaxed structure is formed, which is thought to be a reason why the fatigue strength is improved. On the other hand, a crystal structure of the ε phase is HCP (hexagonal close-packing) and basal sliding is given a priority, and therefore the crystal structure itself is thought to have a property of "being less likely to deform and being brittle". Further, the ε phase forms a coarse columnar crystal and has a structure form disadvantageous for fatigue strength.

In X-ray diffraction peak intensity IFe$_4$N (111) of a (111) crystal plane of the γ' phase-Fe$_4$N appearing near 2θ:41.2 degrees and X-ray diffraction peak intensity IFe$_3$N (111) of a (111) crystal plane of the ε phase-Fe$_{2-3}$N appearing near 2θ:43.7 degrees, which are measured in an X-ray diffraction (XRD) profile of the iron nitride compound layer formed on the surface of the nitrided steel member of the present invention by using an X-ray tube Cu, an intensity ratio expressed by IFe$_4$N (111)/{IFe$_4$N (111)+IFe$_3$N (111)} is 0.5 or more. As described above, the "iron nitride compound layer" is a layer composed of the ε phase-Fe$_{2-3}$N and/or the γ' phase-Fe$_4$N and so on, and by measuring the aforesaid ratio of the X-ray peak intensities when X-ray diffraction analysis is executed on the surface of the steel member, it is determined whether or not the γ' phase is the main component. In the present invention, when the aforesaid intensity ratio is 0.5 or more, it can be determined that the iron nitride compound layer formed on the surface of the nitrided steel member has the γ' phase as the main component, and the nitrided steel member is excellent in pitting resistance and bending fatigue strength. The aforesaid intensity ratio is preferably 0.8 or more, and more preferably 0.9 or more.

Figure 1:
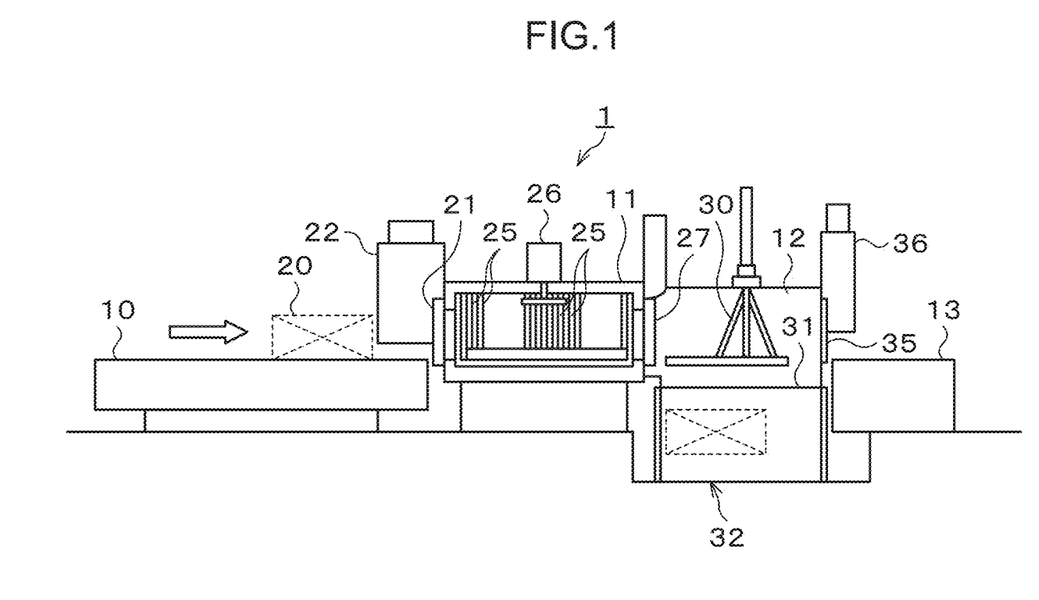
FIG. 1 is an explanatory view of a heat treatment apparatus.

Here, the nitriding treatment in the gas atmosphere applied to the steel member is executed by using a heat treatment apparatus 1 illustrated in FIG. 1, for instance. As illustrated in FIG. 1, the heat treatment apparatus 1 has a loading part 10, a heating chamber 11, a cooling chamber 12, and an unloading conveyor 13. In a case 20 placed on the loading part 10, the aforesaid steel member such as a gear used in an automatic transmission, for instance, is housed. On an entrance side (left side in FIG. 1) of the heating chamber 11, an entrance hood 22 having an openable/closable door 21 is attached.

In the heating chamber 11, heaters 25 are provided. Nitriding treatment gas made of N$_2$ gas, NH$_3$ gas, and H$_2$ gas is led into the heating chamber 11, and the nitriding treatment gas led into the heating chamber 11 is heated to a predetermined temperature by the heaters 25, so that the nitriding treatment of the steel member carried into the heating chamber 11 is executed. On a ceiling of the heating chamber 11, a fan 26 is mounted which stirs the treatment gas in the heating chamber 11 to make the heating temperature of the steel member uniform and controls a wind velocity of the treatment gas hit against the steel member. On an exit side (right side in FIG. 1) of the heating chamber 11, an openable/closable intermediate door 27 is attached.

In the cooling chamber 12, an elevator 30 which lifts up and down the case 20 housing the steel member is provided. In a lower portion of the cooling chamber 12, an oil tank 32 storing cooling oil 31 is provided. On an exit side (right side in FIG. 1) of the cooling chamber 12, an exit hood 36 having an openable/closable door 35 is attached.

In such a heat treatment apparatus 1, the case 20 housing the steel member is carried into the heating chamber 11 from the loading part 10 by a pusher or the like. Incidentally, prior to the nitriding treatment, cleaning (pre-treatment) for removing contaminants and oil of a member to be treated (nitrided steel member) is preferably performed. For example, vacuum cleaning that degreases and dries the member to be treated by melting and replacing the oil and so on by a hydrocarbon-based cleaning liquid and evaporating the oil and so on, alkali cleaning that performs a degreasing treatment by an alkali cleaning liquid, or the like is preferable.

Then, after the case 20 housing the steel member thus having undergone the pre-treatment is carried into the heating chamber 11, the treatment gas is led into the heating chamber 11. Further, the treatment gas led into the heating chamber 11 is heated to a predetermined high temperature by the heaters 25, and the nitriding treatment of the steel member carried into the heating chamber 11 is performed while the treatment gas is stirred by the fan 26.

(Temperature Rising Step)

Figure 2:
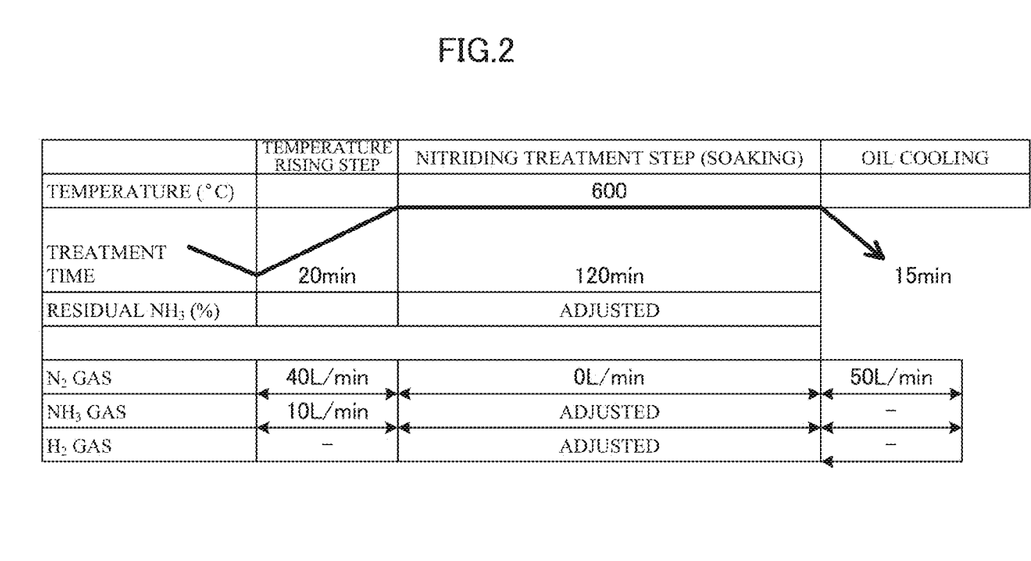
FIG. 2 is an explanatory process chart of a gas nitrocarburizing treatment.

Here, the N$_2$ gas at 0.04 m$^3$/min and the NH$_3$ gas at 0.01 m$^3$/min are first led into the heating chamber 11 for twenty minutes as illustrated in FIG. 2, for instance, and are heated by the heaters 25, whereby a step of increasing the temperature up to a 600° C. nitriding treatment temperature is performed. In the temperature rising step, it is not necessary to precisely control the atmosphere, provided that extreme oxidation of the steel member can be prevented during the heating, and the heating may be performed in an atmosphere of, for instance, N$_2$ or Ar being inert gas. Alternatively, an appropriate amount of the NH$_3$ gas or the like may be mixed as described above to produce a reducing atmosphere.

(Nitriding Treatment Step)

Thereafter, a step of applying the nitriding treatment to the steel member is performed, in which NH$_3$ gas and H$_2$ gas are led into the heating chamber 11 while their flow rates are controlled so that the nitriding treatment gas has a predetermined composition, and heating is performed by the heaters 25, followed by soaking to 600° C. for 120 minutes, for instance. In the step of applying the nitriding treatment to the steel member, a partial pressure of the NH$_3$ gas, a partial pressure of the H$_2$ gas, and a partial pressure of the N$_2$ gas in the heating chamber 11 are controlled within predetermined ranges. These gas partial pressures can be adjusted by the flow rates of the NH$_3$ gas and the H$_2$ gas which are supplied to the heating chamber 11. Incidentally, the N$_2$ gas is obtained when the NH$_3$ gas is decomposed at the nitriding treatment temperature. The N$_2$ gas may be further added, and its flow rate may be adjusted to control the aforesaid gas partial pressures.

In the step of applying the gas nitrocarburizing treatment to the steel member, it is preferable that the flow rates of the $NH_3$ gas and the $H_2$ gas which are led into the heating chamber 11 are controlled, and when necessary, the $N_2$ gas is further led, and the heating temperature of the steel member is kept at 500 to 620° C. When the nitriding treatment temperature is higher than 620° C., softening and strain of the member are liable to increase, and when it is lower than 500° C., a formation speed of the iron nitride compound layer becomes slow, which is not preferable in view of cost, and further the $\epsilon$ phase is likely to be formed. More preferably, the nitriding treatment temperature is 550 to 610° C.

Ratios of the gas partial pressures in the nitriding treatment step are controlled so that the ratio of the $NH_3$ gas is 0.08 to 0.34, the ratio of the $H_2$ gas is 0.54 to 0.82, and the ratio of the $N_2$ gas is 0.09 to 0.18 when the total pressure is defined as 1. When the ratio of the partial pressure of the $H_2$ gas is smaller than 0.54, an iron nitride compound having the $\epsilon$ phase as the main component is likely to be generated, and when it is over 0.82, a generation speed of the iron nitride compound may become very low or the iron nitride compound may not be generated. Further, when the ratio of the partial pressure of the $NH_3$ gas is larger than 0.34, the iron nitride compound having the $\epsilon$ phase as the main component is likely to be generated, and when it is smaller than 0.08, the generation speed of the iron nitride compound may become very low or the iron nitride compound may not be generated. Incidentally, the total pressure in the nitriding treatment step may be a pressure-reduced or pressurized atmosphere. However, in view of manufacturing cost and handlability of the heat treatment apparatus, the pressure is preferably a substantially atmospheric pressure, for example, 0.092 to 0.11 MPa. Further, as for the ratio of the gas partial pressure, it is more preferable that the ratio of the $NH_3$ gas is 0.09 to 0.20, the ratio of the $H_2$ gas is 0.60 to 0.80, and the ratio of the $N_2$ gas is 0.09 to 0.17.

In the nitriding treatment step of the present invention, the gas flow velocity (wind velocity) at which the nitriding treatment gas hits against the treatment target, that is, a relative speed of the nitriding treatment gas coming into contact with a surface of the treatment target is preferably controlled to 1 m/s or more, further, 1.5 m/s or more by the fan or the like in the heating chamber. When the flow velocity is less than 1 m/s, the formation of the iron nitride compound may become uneven or the iron nitride compound with the $\gamma'$ phase may not be formed. Further, the iron nitride compound layer can be more uniformly formed as the flow velocity is higher, but in order to increase the flow velocity, some measure has to be taken in the apparatus such as increasing power of the fan. However, considering the manufacturing cost, size, and so on of the apparatus, the flow velocity is preferably about 6 m/s at the highest. Incidentally, in a conventional gas nitrocarburizing treatment, a nitride compound having the $\epsilon$ phase as the main component is formed without any trouble even if the flow velocity is, for example, 0 m/s.

(Cooling Step)

Then, when the step of applying the nitriding treatment to the steel member is finished, the case 20 housing the steel member is next carried to the cooling chamber 12. Then, in the cooling chamber 12, the case 20 housing the steel member is sunk in the oil tank 32 by the elevator 30, and the steel member is cooled for fifteen minutes, for instance. Then, when the cooling is finished, the case 20 housing the steel member is carried out to the unloading conveyor 13. Thus, the nitriding treatment is finished. Incidentally, the cooling in the cooling step need not be the above-described oil cooling, but may be performed by a method such as air cooling, gas cooling, or water cooling.

By performing the nitriding treatment under the above-described conditions, it is possible to obtain the nitrided steel member that has, on its surface, the iron nitride compound layer having the $\gamma'$ phase as the main component. The steel member thus obtained is strengthened by a nitrogen diffusion layer and a nitride being formed inside, and comes to have sufficient pitting resistance and bending fatigue strength by the $\gamma'$ phase-rich iron nitride compound layer being formed on the surface.

Incidentally, the thickness of the iron nitride compound can be controlled in the nitriding treatment gas atmosphere of the present invention by time and temperature. Specifically, when the time is increased, the iron nitride compound becomes thick, and when the temperature is increased, the generation speed of the iron nitride compound becomes high. Note that the nitriding treatment time is desirably within a range over 0.5 hours and less than ten hours.

Further, the nitriding treatment of the present invention is a treatment at a temperature equal to or lower than an austenite transformation temperature and thus causes less strain as compared with carburizing and carbonitriding treatments. Further, since a hardening process which is an essential process in the carburizing and carbonitriding treatments can be omitted, a strain variation amount is also small. As a result, strain is low, and it is possible to obtain a high-strength, low-strain nitrided steel member.

Further, fatigue strength is thought to be governed by the composition (the $\gamma'$ phase or the $\epsilon$ phase) of the iron nitride compound layer formed on the surface of the member, hardness of the iron nitride compound layer, and hardness of the base metal immediately thereunder. Hereinafter, examples will be presented.

EXAMPLES

Components, an Hs value, an Hc value, and Vickers hardness of each of steel members and iron nitride compound layers of the examples and comparative examples are presented in Table 1. Manufacturing conditions are presented in Table 2. Evaluation results are presented in Table 3.

TABLE 1

| STEEL MEMBER AND IRON NITRIDE COMPOUND LAYER | | | | | | | | | | | |
|---|---|---|---|---|---|---|---|---|---|---|---|
| CHEMICAL COMPOSITION OF STEEL MEMBER (mass %) BALANCE: Fe AND IMPURITIES | | | | | | | | | | | |
| | C | Si | Mn | P | S | Cr | Mo | V | Al | N | O |
| | 0.05–0.14 | 0.10–0.30 | 0.4–1.4 | 0.030 OR LESS | 0.005–0.03 | 0.9–1.9 | 0–0.50 | 0–0.40 | 0.01–0.14 | 0.008 OR LESS | 0.0030 OR LESS |
| EXAMPLE 1 | 0.07 | 0.19 | 1.28 | 0.015 | 0.025 | 1.32 | 0.34 | 0.23 | 0.030 | 0.0050 | 0.0015 |
| EXAMPLE 2 | 0.07 | 0.16 | 1.27 | 0.025 | 0.014 | 0.90 | 0.20 | 0.00 | 0.027 | 0.0080 | 0.0009 |

TABLE 1-continued

STEEL MEMBER AND IRON NITRIDE COMPOUND LAYER

| | | | | | | | | | | | |
|---|---|---|---|---|---|---|---|---|---|---|---|
| EXAMPLE 3 | 0.09 | 0.18 | 0.70 | 0.009 | 0.014 | 1.20 | 0.00 | 0.13 | 0.030 | 0.0045 | 0.0016 |
| EXAMPLE 4 | 0.10 | 0.15 | 1.10 | 0.007 | 0.015 | 1.20 | 0.00 | 0.15 | 0.030 | 0.0048 | 0.0010 |
| EXAMPLE 5 | 0.09 | 0.14 | 1.26 | 0.009 | 0.015 | 1.27 | 0.00 | 0.00 | 0.115 | 0.0044 | 0.0010 |
| EXAMPLE 6 | 0.07 | 0.19 | 1.28 | 0.015 | 0.025 | 1.32 | 0.34 | 0.23 | 0.030 | 0.0050 | 0.0015 |
| EXAMPLE 7 | 0.07 | 0.19 | 1.28 | 0.015 | 0.025 | 1.32 | 0.34 | 0.23 | 0.030 | 0.0050 | 0.0015 |
| COMPARATIVE EXAMPLE 1 | 0.34 | 0.16 | 0.85 | 0.020 | 0.014 | 0.90 | 0.20 | 0.00 | 0.030 | 0.0110 | 0.0015 |
| COMPARATIVE EXAMPLE 2 | 0.19 | 0.15 | 0.84 | 0.019 | 0.014 | 1.68 | 0.36 | 0.19 | 0.031 | 0.0095 | 0.0015 |
| COMPARATIVE EXAMPLE 3 | 0.20 | 0.25 | 0.72 | 0.018 | 0.017 | 1.05 | 0.00 | 0.00 | 0.030 | 0.0120 | 0.0012 |
| COMPARATIVE EXAMPLE 4 | 0.20 | 0.25 | 0.72 | 0.017 | 0.016 | 1.05 | 0.20 | 0.00 | 0.030 | 0.0110 | 0.0011 |
| COMPARATIVE EXAMPLE 5 | 0.07 | 0.19 | 1.28 | 0.015 | 0.025 | 1.32 | 0.34 | 0.23 | 0.030 | 0.0050 | 0.0015 |
| COMPARATIVE EXAMPLE 6 | 0.09 | 0.14 | 1.26 | 0.009 | 0.015 | 1.27 | 0.00 | 0.00 | 0.115 | 0.0044 | 0.0010 |
| COMPARATIVE EXAMPLE 7 | 0.20 | 0.25 | 0.72 | 0.017 | 0.016 | 1.05 | 0.20 | 0.00 | 0.030 | 0.0110 | 0.0011 |
| COMPARATIVE EXAMPLE 8 | 0.46 | 0.26 | 0.29 | 0.022 | 0.014 | 1.50 | 0.23 | 0.00 | 0.950 | 0.0045 | 0.0007 |
| COMPARATIVE EXAMPLE 9 | 0.37 | 0.93 | 0.46 | 0.022 | 0.017 | 5.00 | 1.25 | 1.00 | 0.030 | 0.0085 | 0.0039 |
| COMPARATIVE EXAMPLE 10 | 0.10 | 0.15 | 1.10 | 0.007 | 0.015 | 1.20 | 0.00 | 0.15 | 0.030 | 0.0048 | 0.0010 |
| COMPARATIVE EXAMPLE 11 | 0.10 | 0.15 | 1.10 | 0.007 | 0.015 | 1.20 | 0.00 | 0.15 | 0.030 | 0.0048 | 0.0010 |
| COMPARATIVE EXAMPLE 12 | 0.20 | 0.25 | 0.72 | 0.017 | 0.016 | 1.05 | 0.20 | 0.00 | 0.030 | 0.0110 | 0.0011 |
| COMPARATIVE EXAMPLE 13 | 0.07 | 0.19 | 1.28 | 0.015 | 0.025 | 1.32 | 0.34 | 0.23 | 0.030 | 0.0050 | 0.0015 |

| | | | VICKERS HARDNESS (HV) | | |
|---|---|---|---|---|---|
| | Hs VALUE 1.19 OR MORE | Hc VALUE 3.76 OR LESS | BASE METAL 700 OR MORE | COMPOUND LAYER 900 OR LESS | HARDNESS DIFFERENCE 150 OR LESS |
| EXAMPLE 1 | 2.34 | 3.60 | 812 | 871 | 59 |
| EXAMPLE 2 | 1.31 | 2.64 | 740 | 776 | 36 |
| EXAMPLE 3 | 1.73 | 2.59 | 715 | 790 | 75 |
| EXAMPLE 4 | 1.83 | 2.83 | 785 | 828 | 43 |
| EXAMPLE 5 | 1.97 | 3.32 | 749 | 841 | 92 |
| EXAMPLE 6 | 2.34 | 3.60 | 803 | 878 | 75 |
| EXAMPLE 7 | 2.34 | 3.60 | 798 | 880 | 82 |
| COMPARATIVE EXAMPLE 1 | 0.29 | 2.84 | 690 | 765 | 75 |
| COMPARATIVE EXAMPLE 2 | 2.20 | 4.14 | 780 | 917 | 137 |
| COMPARATIVE EXAMPLE 3 | 0.90 | 2.49 | 648 | 759 | 111 |
| COMPARATIVE EXAMPLE 4 | 0.93 | 2.79 | 669 | 766 | 97 |
| COMPARATIVE EXAMPLE 5 | 2.34 | 3.60 | 748 | 930 | 182 |
| COMPARATIVE EXAMPLE 6 | 1.97 | 3.32 | 761 | 965 | 204 |
| COMPARATIVE EXAMPLE 7 | 0.93 | 2.79 | 731 | 911 | 180 |
| COMPARATIVE EXAMPLE 8 | 3.69 | 7.57 | 855 | 1102 | 247 |
| COMPARATIVE EXAMPLE 9 | 7.46 | 11.04 | 890 | 1095 | 205 |
| COMPARATIVE EXAMPLE 10 | 1.83 | 2.83 | 781 | *1 | — |
| COMPARATIVE EXAMPLE 11 | 1.83 | 2.83 | 778 | 951 | 173 |
| COMPARATIVE EXAMPLE 12 | 0.93 | 2.79 | 745 | NO LAYER | 0 |
| COMPARATIVE EXAMPLE 13 | 2.34 | 3.60 | 813 | *1 | — |

*1 CANNOT BE MEASURED DUE TO THIN FILM

TABLE 2

| | MANUFACTURING CONDITION | | | | | | COMPOUND LAYER | | |
|---|---|---|---|---|---|---|---|---|---|
| | NITRIDING TREATMENT CONDITION | | | | | | | | |
| | TEMPER-ATURE (° C.) | TREAT-MENT TIME (h) | RATIO OF PARTIAL PRESSURE OF $NH_3$ GAS | RATIO OF PARTIAL PRESSURE OF $H_2$ GAS | RATIO OF PARTIAL PRESSURE OF $N_2$ GAS | GAS FLOW VELOCITY (m/s) | STATE | XRD DIFFRACTION INTENSITY RATIO | THICK-NESS (μm) |
| EXAMPLE 1 | 610 | 5 | 0.09 | 0.77 | 0.14 | 2~2.6 | γ'-RICH PHASE | ≥0.98 | 10 |
| EXAMPLE 2 | 610 | 5 | 0.09 | 0.77 | 0.14 | 2~2.6 | γ'-RICH PHASE | ≥0.98 | 11 |
| EXAMPLE 3 | 610 | 5 | 0.09 | 0.77 | 0.14 | 2~2.6 | γ'-RICH PHASE | ≥0.98 | 12 |
| EXAMPLE 4 | 610 | 5 | 0.09 | 0.77 | 0.14 | 2~2.6 | γ'-RICH PHASE | ≥0.98 | 11 |
| EXAMPLE 5 | 610 | 5 | 0.09 | 0.77 | 0.14 | 2~2.6 | γ'-RICH PHASE | ≥0.98 | 10 |
| EXAMPLE 6 | 610 | 2.5 | 0.09 | 0.77 | 0.14 | 2~2.6 | γ'-RICH PHASE | ≥0.98 | 3 |
| EXAMPLE 7 | 610 | 8 | 0.09 | 0.77 | 0.14 | 2~2.6 | γ'-RICH PHASE | ≥0.98 | 16 |
| COMPARATIVE EXAMPLE 1 | 610 | 5 | 0.09 | 0.77 | 0.14 | 2~2.6 | γ'-RICH PHASE | ≥0.98 | 9 |
| COMPARATIVE EXAMPLE 2 | 610 | 5 | 0.09 | 0.77 | 0.14 | 2~2.6 | γ'-RICH PHASE | ≥0.98 | 9 |
| COMPARATIVE EXAMPLE 3 | 610 | 5 | 0.09 | 0.77 | 0.14 | 2~2.6 | γ'-RICH PHASE | ≥0.98 | 10 |
| COMPARATIVE EXAMPLE 4 | 610 | 5 | 0.09 | 0.77 | 0.14 | 2~2.6 | γ'-RICH PHASE | ≥0.98 | 11 |
| COMPARATIVE EXAMPLE 5 | 570 | 2.5 | 0.4 | 0.28 | 0.32 | 2~2.6 | ε-RICH PHASE | 0.01 | 12 |
| COMPARATIVE EXAMPLE 6 | 570 | 2.5 | 0.4 | 0.28 | 0.32 | 2~2.6 | ε-RICH PHASE | 0.01 | 10 |
| COMPARATIVE EXAMPLE 7 | 570 | 2.5 | 0.4 | 0.28 | 0.32 | 2~2.6 | ε-RICH PHASE | 0.01 | 11 |
| COMPARATIVE EXAMPLE 8 | 570 | 2.5 | 0.4 | 0.28 | 0.32 | 2~2.6 | ε-RICH PHASE | 0.01 | 10 |
| COMPARATIVE EXAMPLE 9 | 570 | 2.5 | 0.4 | 0.28 | 0.32 | 2~2.6 | ε-RICH PHASE | 0.01 | 13 |
| COMPARATIVE EXAMPLE 10 | 610 | 0.5 | 0.09 | 0.77 | 0.14 | 2~2.6 | γ'-RICH PHASE | ≥0.98 | 1 |
| COMPARATIVE EXAMPLE 11 | 610 | 10 | 0.09 | 0.77 | 0.14 | 2~2.6 | γ'-RICH PHASE | ≥0.98 | 20 |
| COMPARATIVE EXAMPLE 12 | GAS CARBURIZING TREATMENT | | | | | | CARBURIZED LAYER | — | — |
| COMPARATIVE EXAMPLE 13 | 600 | 2 | 0.16 | 0.72 | 0.12 | 0~0.5 | ε-RICH PHASE | 0.01 | 0~0.5 |

TABLE 3

| | EVALUATION RESULT | | | | |
|---|---|---|---|---|---|
| | PEEL STRENGTH (LOAD 60N, NUMBER OF RECIPROCATION 5 TIMES) | ROLLER PITTING TEST PITTING LIFE | | ONO-TYPE ROTATING BENDING FATIGUE STRENGTH (MPa) | GEAR STRAIN AMOUNT |
| | | CONTACT PRESSURE | RESULT | $1.0 \times 10^7$ CYCLE STRENGTH | VARIATION OF TOOTH TRACE INCLINATION |
| EXAMPLE 1 | NO PEELING | 1800 | $1.0 \times 10^7$ CYCLE NO PEELING | 520 | 4 |
| EXAMPLE 2 | NO PEELING | 1800 | $1.0 \times 10^7$ CYCLE NO PEELING | — | 8 |
| EXAMPLE 3 | NO PEELING | 1800 | $1.0 \times 10^7$ CYCLE NO PEELING | 440 | 5 |
| EXAMPLE 4 | NO PEELING | 1800 | $1.0 \times 10^7$ CYCLE NO PEELING | 470 | — |
| EXAMPLE 5 | NO PEELING | 1800 | $1.0 \times 10^7$ CYCLE NO PEELING | — | — |
| EXAMPLE 6 | NO PEELING | 1800 | $1.0 \times 10^7$ CYCLE NO PEELING | — | — |
| EXAMPLE 7 | NO PEELING | 1800 | $1.0 \times 10^7$ CYCLE NO PEELING | — | — |
| COMPARATIVE EXAMPLE 1 | PEELING OCCURRED: SEVERAL PLACES | 1800 | $1.0 \times 10^7$ CYCLE NO PEELING | | |

TABLE 3-continued

EVALUATION RESULT

| | PEEL STRENGTH (LOAD 60N, NUMBER OF RECIPROCATION 5 TIMES) | ROLLER PITTING TEST PITTING LIFE | | ONO-TYPE ROTATING BENDING FATIGUE STRENGTH (MPa) $1.0 \times 10^7$ CYCLE STRENGTH | GEAR STRAIN AMOUNT VARIATION OF TOOTH TRACE INCLINATION |
|---|---|---|---|---|---|
| | | CONTACT PRESSURE | RESULT | | |
| COMPARATIVE EXAMPLE 2 | PEELING OCCURRED: SEVERAL PLACES | 1800 | $9.5 \times 10^6$ CYCLE DAMAGE OCCURRED | — | |
| COMPARATIVE EXAMPLE 3 | PEELING OCCURRED: SEVERAL PLACES | 1800 | $6.2 \times 10^6$ CYCLE DAMAGE OCCURRED | — | |
| COMPARATIVE EXAMPLE 4 | PEELING OCCURRED: SEVERAL PLACES | 1800 | $6.8 \times 10^6$ CYCLE DAMAGE OCCURRED | — | |
| COMPARATIVE EXAMPLE 5 | PEELING OCCURRED: 10 PLACES OR MORE | 1800 | $1.0 \times 10^4$ CYCLE PEELING OCCURRED | — | 8 |
| COMPARATIVE EXAMPLE 6 | PEELING OCCURRED: 10 PLACES OR MORE | 1800 | $1.0 \times 10^4$ CYCLE PEELING OCCURRED | — | 6 |
| COMPARATIVE EXAMPLE 7 | PEELING OCCURRED: 10 PLACES OR MORE | 1800 | $1.0 \times 10^4$ CYCLE PEELING OCCURRED | 320 | 7 |
| COMPARATIVE EXAMPLE 8 | PEELING OCCURRED: 10 PLACES OR MORE | 1800 | $1.0 \times 10^3$ CYCLE PEELING OCCURRED | — | |
| COMPARATIVE EXAMPLE 9 | PEELING OCCURRED: 10 PLACES OR MORE | 1800 | $1.0 \times 10^3$ CYCLE PEELING OCCURRED | — | |
| COMPARATIVE EXAMPLE 10 | NO PEELING | 1800 | $4.2 \times 10^6$ CYCLE DAMAGE OCCURRED | — | |
| COMPARATIVE EXAMPLE 11 | PEELING OCCURRED: SEVERAL PLACES | 1800 | $5.5 \times 10^6$ CYCLE DAMAGE OCCURRED | — | |
| COMPARATIVE EXAMPLE 12 | — | 1800 | $1.0 \times 10^7$ CYCLE NO PEELING | 430 | 38 |
| COMPARATIVE EXAMPLE 13 | — | — | — | — | — |

Example 1

Samples of a steel member were prepared which each had a composition containing, by mass %, C: 0.07%, Si: 0.19%, Mn: 1.28%, P: 0.015%, S: 0.025%, Cr: 1.32%, Mo: 0.34%, V: 0.23%, Al: 0.030%, N: 0.0050%, O: 0.0015%, and the balance being Fe and impurities and whose Hs value was 2.34 and Hc value was 3.60. Further, the shapes of the samples were prepared for peel strength, nitridation quality confirmation (disk shape), a roller pitting test, an Ono-type rotating bending fatigue test, and gear strain amount measurement.

Next, the samples were subjected to vacuum cleaning as a pre-treatment of gas nitrocarburizing.

Next, a nitriding treatment of the samples was executed in a gas atmosphere. First, in a temperature rising step, flow rates of $NH_3$ gas and $N_2$ gas which were supplied to a furnace (heating chamber) were set to 0.01 m³/min and 0.04 m³/min respectively, and the temperature was increased up to a nitriding treatment temperature. As conditions of the subsequently executed nitriding treatment, the temperature was set to 610° C., the nitriding time was set to 5 h (hours), and by adjusting the gas flow rates of the $NH_3$ gas, $H_2$ gas, and the $N_2$ gas supplied into the furnace, a ratio of a partial pressure of the $NH_3$ gas was set to 0.09 (the partial pressure of the $NH_3$ gas was set to 0.0091 MPa), a ratio of a partial pressure of the $H_2$ gas was set to 0.77 (the partial pressure of the $H_2$ gas was set to 0.078 MPa), and a ratio of a partial pressure of the $N_2$ gas was set to 0.14 (the partial pressure of the $N_2$ gas was set to 0.014 MPa) when a total pressure in the furnace was defined as 1. Note that the total pressure in the furnace at the time of the nitriding treatment was an atmospheric pressure, and by strongly stirring the nitriding gas by increasing the rotation speed of a fan, a gas flow velocity (wind velocity) of the in-furnace gas coming into contact with the test pieces was set to 2 to 2.6 m/s (second). Thereafter, the test pieces were immersed in 130° C. oil to be oil-cooled, and were subjected to the evaluations.

Incidentally, analysis of the partial pressure of $NH_3$ in the nitriding treatment gas was executed by "gas nitrocarburizing furnace $NH_3$ analyzer" (manufactured by HORIBA, model FA-1000), analysis of the partial pressure of $H_2$ was executed by "continuous gas analyzer" (manufactured by ABB, model AO2000), and the rest was defined as the partial pressure of $N_2$. Further, the gas flow velocity was measured by "windmill anemometer" (manufactured by testo, model 350M/XL) under the same conditions (nitriding treatment gas composition and so on) as those of the nitriding treatment step except that the temperature in the furnace was set to room temperature in advance before the nitriding treatment. In the present invention, this value is defined as the gas flow velocity.

Example 2

Samples were prepared in the same manner as in the example 1 except that they each had a composition containing, by mass %, C: 0.07%, Si: 0.16%, Mn: 1.27%, P: 0.025%, S: 0.014%, Cr: 0.90%, Mo: 0.20%, Al: 0.027%, N: 0.0080%, O: 0.0009%, and the balance being Fe and impurities and an Hs value was 1.31 and Hc value was 2.64. Next, a pre-treatment and a nitriding treatment were executed under the same conditions as those of the example 1 to form an iron nitride compound on a surface of each of the samples, and thereafter the evaluations were conducted.

Example 3

Samples were prepared in the same manner as in the example 1 except that they each had a composition containing, by mass %, C: 0.09%, Si: 0.18%, Mn: 0.70%, P: 0.009%, S: 0.014%, Cr: 1.20%, V: 0.13%, Al: 0.030%, N:

0.0045%, O: 0.0016%, and the balance being Fe and impurities and an Hs value was 1.73 and an Hc value was 2.59. Next, a pre-treatment and a nitriding treatment were executed under the same conditions as those of the example 1 to form an iron nitride compound on a surface of each of the samples, and thereafter the evaluations were conducted.

Example 4

Samples were prepared in the same manner as in the example 1 except that they each had a composition containing, by mass %, C: 0.10%, Si: 0.15%, Mn: 1.10%, P: 0.007%, S: 0.015%, Cr: 1.20%, V: 0.15%, Al: 0.030%, N: 0.0048%, O: 0.0010, and the balance being Fe and impurities and an Hs value was 1.83 and an Hc value was 2.83. Next, a pre-treatment and a nitriding treatment were executed under the same conditions as those of the example 1 to form an iron nitride compound on a surface of each of the samples, and thereafter the evaluations were conducted.

Example 5

Samples were prepared in the same manner as in the example 1 except that they each had a composition containing, by mass %, C: 0.09%, Si: 0.14%, Mn: 1.26%, P: 0.009%, S: 0.015%, Cr: 1.27%, Al: 0.115%, N: 0.0044%, O: 0.0010%, and the balance being Fe and impurities and an Hs value was 1.97 and an Hc value was 3.32. Next, a pre-treatment and a nitriding treatment were executed under the same conditions as those of the example 1 to form an iron nitride compound on a surface of each of the samples, and thereafter the evaluations were conducted.

Example 6

Samples were prepared in the same manner as in the example 1 except that they each had a composition containing, by mass %, C: 0.07%, Si: 0.19%, Mn: 1.28%, P: 0.015%, S: 0.025%, Cr: 1.32%, Mo: 0.34%, V: 0.23%, Al: 0.030%, N: 0.0050%, O: 0.0015%, and the balance being Fe and impurities and an Hs value was 2.34 and an Hc value was 3.60. Next, the same pre-treatment as that of the example 1 and a nitriding treatment under the same nitriding treatment condition as that of the example 1 were executed except that the nitriding treatment time was set to 2.5 h, to form an iron nitride compound on a surface of each of the samples, and thereafter the evaluations were conducted.

Example 7

Samples were prepared in the same manner as in the example 1 except that they each had a composition containing, by mass %, C: 0.07%, Si: 0.19%, Mn: 1.28%, P: 0.015%, S: 0.025%, Cr: 1.32%, Mo: 0.34%, V: 0.23%, Al: 0.030%, N: 0.0050%, O: 0.0015%, and the balance being Fe and impurities and an Hs value was 2.34 and an Hc value was 3.60. Next, the same pre-treatment as that of the example 1 and a nitriding treatment under the same nitriding treatment condition as that of the example 1 were executed except that the nitriding treatment time was set to 8 h, to form an iron nitride compound on a surface of each of the samples, and thereafter the evaluations were conducted.

Comparative Example 1

Samples were prepared in the same manner as in the example 1 except that they each had a composition containing, by mass %, C: 0.34%, Si: 0.16%, Mn: 0.85%, P: 0.020%, S: 0.014%, Cr: 0.90%, Mo: 0.20%, Al: 0.030%, N: 0.0110%, O: 0.0015%, and the balance being Fe and impurities and an Hs value was 0.29 and an Hc value was 2.84. Next, a pre-treatment and a nitriding treatment were executed under the same conditions as those of the example 1 to form an iron nitride compound on a surface of each of the samples, and thereafter the evaluations were conducted.

Comparative Example 2

Samples were prepared in the same manner as in the example 1 except that they each had a composition containing, by mass %, C: 0.19%, Si: 0.15%, Mn: 0.84%, P: 0.019%, S: 0.014%, Cr: 1.68%, Mo: 0.36%, V: 0.19%, Al: 0.031%, N: 0.0095%, O: 0.0015%, and the balance being Fe and impurities and an Hs value was 2.20 and an Hc value was 4.14. Next, a pre-treatment and a nitriding treatment were executed under the same conditions as those of the example 1 to form an iron nitride compound on a surface of each of the samples, and thereafter the evaluations were conducted.

Comparative Example 3

Samples were prepared in the same manner as in the example 1 except that they each had a composition containing, by mass %, C: 0.20%, Si: 0.25%, Mn: 0.72%, P: 0.018%, S: 0.017%, Cr: 1.05%, Al: 0.030%, N: 0.0120%, O: 0.0012%, and the balance being Fe and impurities and an Hs value was 0.90 and an Hc value was 2.49. Next, a pre-treatment and a nitriding treatment were executed under the same conditions as those of the example 1 to form an iron nitride compound on a surface of each of the samples, and thereafter the evaluations were conducted.

Comparative Example 4

Samples were prepared in the same manner as in the example 1 except that they each had a composition containing, by mass %, C: 0.20%, Si: 0.25%, Mn: 0.72%, P: 0.017%, S: 0.016%, Cr: 1.05%, Mo: 0.20%, Al: 0.030%, N: 0.0110%, O: 0.0011%, and the balance being Fe and impurities and an Hs value was 0.93 and an Hc value was 2.79. Next, a pre-treatment and a nitriding treatment were executed under the same conditions as those of the example 1 to form an iron nitride compound on a surface of each of the samples, and thereafter the evaluations were conducted.

Comparative Example 5

Samples were prepared in the same manner as in the example 1 except that they each had a composition containing, by mass %, C: 0.07%, Si: 0.19%, Mn: 1.28%, P: 0.015%, S: 0.025%, Cr: 1.32%, Mo: 0.34%, V: 0.23%, Al: 0.030%, N: 0.0050%, O: 0.0015%, and the balance being Fe and impurities and an Hs value was 2.34 and an Hc value was 3.60. Next, a pre-treatment and a temperature rising step of a nitriding treatment were executed under the same conditions as those of the example 1, and an iron nitride compound was formed on a surface of each of the samples by performing the nitriding treatment by the same method as in the example 1 except that, as conditions of the nitriding treatment, the temperature was set to 570° C. and the nitriding time was set to 2.5 h (hours), and by adjusting gas flow rates of $NH_3$ gas, $H_2$ gas, and $N_2$ gas supplied into a furnace, a ratio of a partial pressure of the $NH_3$ gas was set to 0.4 (the partial pressure of the NH₃ gas was set to 0.041 MPa), a ratio of a partial pressure of the H₂ gas was set to 0.28 (the partial pressure of the H₂ gas was set to 0.028 MPa), and a ratio of a partial pressure of the N₂ gas was set to 0.32 (the partial pressure of the N₂ gas was set to 0.032 MPa) when a total pressure in the furnace was defined as 1, and thereafter the evaluations were conducted.

Comparative Example 6

Samples were prepared in the same manner as in the example 1 except that they each had a composition containing, by mass %, C: 0.09%, Si: 0.14%, Mn: 1.26%, P: 0.009%, S: 0.015%, Cr: 1.27%, Al: 0.115%, N: 0.0044%, O: 0.0010%, and the balance being Fe and impurities and an Hs value was 1.97 and an Hc value was 3.32. Next, a pre-treatment and a temperature rising step of a nitriding treatment were executed under the same conditions as those of the example 1, and an iron nitride compound was formed on a surface of each of the samples by performing the nitriding treatment by the same method as in the example 1 except that, as conditions of the nitriding treatment, the temperature was set to 570° C. and the nitriding time was set to 2.5 h (hours), and by adjusting gas flow rates of NH₃ gas, H₂ gas, and N₂ gas supplied into a furnace, a ratio of a partial pressure of the NH₃ gas was set to 0.4 (the partial pressure of the NH₃ gas was set to 0.041 MPa), a ratio of a partial pressure of the H₂ gas was set to 0.28 (the partial pressure of the H₂ gas was set to 0.028 MPa), and a ratio of a partial pressure of the N₂ gas was set to 0.32 (the partial pressure of the N₂ gas was set to 0.032 MPa) when a total pressure in the furnace was defined as 1, and thereafter the evaluations were conducted.

Comparative Example 7

Samples were prepared in the same manner as in the example 1 except that they each had a composition containing, by mass %, C: 0.20%, Si: 0.25%, Mn: 0.72%, P: 0.017%, S: 0.016%, Cr: 1.05%, Mo: 0.20%, Al: 0.030%, N: 0.0110%, O: 0.0011%, and the balance being Fe and impurities and an Hs value was 0.93 and an Hc value was 2.79. Next, a pre-treatment and a temperature rising step of a nitriding treatment were executed under the same conditions as those of the example 1, and an iron nitride compound was formed on a surface of each of the samples by performing the nitriding treatment by the same method as in the example 1 except that, as conditions of the nitriding treatment, the temperature was set to 570° C. and the nitriding time was set to 2.5 h (hours), and by adjusting gas flow rates of NH₃ gas, H₂ gas, and N₂ gas supplied into a furnace, a ratio of a partial pressure of the NH₃ gas was set to 0.4 (the partial pressure of the NH₃ gas was set to 0.041 MPa), a ratio of a partial pressure of the H₂ gas was set to 0.28 (the partial pressure of the H₂ gas was set to 0.028 MPa), and a ratio of a partial pressure of the N₂ gas was set to 0.32 (the partial pressure of the N₂ gas was set to 0.032 MPa) when a total pressure in the furnace was defined as 1, and thereafter the evaluations were conducted.

Comparative Example 8

Samples were prepared in the same manner as in the example 1 except that they each had a composition containing, by mass %, C: 0.46%, Si: 0.26%, Mn: 0.29%, P: 0.022%, S: 0.014%, Cr: 1.50%, Mo: 0.23%, Al: 0.950%, N: 0.0045%, O: 0.0007%, and the balance being Fe and impurities and an Hs value was 3.69 and an Hc value was 7.57. Next, a pre-treatment and a temperature rising step of a nitriding treatment were executed under the same conditions as those of the example 1, and an iron nitride compound was formed on a surface of each of the samples by performing the nitriding treatment by the same method as in the example 1 except that, as conditions of the nitriding treatment, the temperature was set to 570° C. and the nitriding time was set to 2.5 h (hours), and by adjusting gas flow rates of NH₃ gas, H₂ gas, and N₂ gas supplied into a furnace, a ratio of a partial pressure of the NH₃ gas was set to 0.4 (the partial pressure of the NH₃ gas was set to 0.041 MPa), a ratio of a partial pressure of the H₂ gas was set to 0.28 (the partial pressure of the H₂ gas was set to 0.028 MPa), and a ratio of a partial pressure of the N₂ gas was set to 0.32 (the partial pressure of the N₂ gas was set to 0.032 MPa) when a total pressure in the furnace was defined as 1, and thereafter the evaluations were conducted.

Comparative Example 9

Samples were prepared in the same manner as in the example 1 except that they each had a composition containing, by mass %, C: 0.37%, Si: 0.93%, Mn: 0.46%, P: 0.022%, S: 0.017%, Cr: 5.00%, Mo: 1.25%, V: 1.00%, Al: 0.030%, N: 0.0085%, O: 0.0039%, and the balance being Fe and impurities and an Hs value was 7.46 and an Hc value was 11.04. Next, a pre-treatment and a temperature rising step of a nitriding treatment were executed under the same conditions as those of the example 1, and an iron nitride compound was formed on a surface of each of the samples by performing the nitriding treatment by the same method as in the example 1 except that, as conditions of the nitriding treatment, the temperature was set to 570° C. and the nitriding time was set to 2.5 h (hours), and by adjusting gas flow rates of NH₃ gas, H₂ gas, and N₂ gas supplied into a furnace, a ratio of a partial pressure of the NH₃ gas was set to 0.4 (the partial pressure of the NH₃ gas was set to 0.041 MPa), a ratio of a partial pressure of the H₂ gas was set to 0.28 (the partial pressure of the H₂ gas was set to 0.028 MPa), and a ratio of a partial pressure of the N₂ gas was set to 0.32 (the partial pressure of the N₂ gas was set to 0.032 MPa) when a total pressure in the furnace was defined as 1, and thereafter the evaluations were conducted.

Comparative Example 10

Samples were prepared in the same manner as in the example 1 except that they each had a composition containing, by mass %, C: 0.10%, Si: 0.15%, Mn: 1.10%, P: 0.007%, S: 0.015%, Cr: 1.20%, V: 0.15%, Al: 0.030%, N: 0.0048%, O: 0.0010%, and the balance being Fe and impurities and an Hs value was 1.83 and an Hc value was 2.83. Next, a pre-treatment and a temperature rising step of a nitriding treatment were executed under the same conditions as those of the example 1, and an iron nitride compound was formed on a surface of each of the samples by performing the nitriding treatment by the same method as in the example 1 except that, as conditions of the nitriding treatment, the nitriding time was set to 0.5 h (hours), and thereafter the evaluations were conducted.

Comparative Example 11

Samples were prepared in the same manner as in the example 1 except that they each had a composition containing, by mass %, C: 0.10%, Si: 0.15%, Mn: 1.10%, P:

0.007%, S: 0.015%, Cr: 1.20%, V: 0.15%, Al: 0.030%, N: 0.0048%, O: 0.0010%, and the balance being Fe and impurities and an Hs value was 1.83 and an Hc value was 2.83. Next, a pre-treatment and a temperature rising step of a nitriding treatment were executed under the same conditions as those of the example 1, and an iron nitride compound was formed on a surface of each of the samples by performing the nitriding treatment by the same method as in the example 1 except that, as conditions of the nitriding treatment, the nitriding time was set to 10 h (hours), and thereafter the evaluations were conducted.

Comparative Example 12

Samples were prepared in the same manner as in the example 1 except that they each had a composition containing, by mass %, C: 0.20%, Si: 0.25%, Mn: 0.72%, P: 0.017%, S: 0.016%, Cr: 1.05%, Mo: 0.20%, Al: 0.030%, N: 0.0110, O: 0.0011%, and the balance being Fe and impurities and an Hs value was 0.93 and an Hc value was 2.79. Next, a pre-treatment was executed under the same conditions as those of the example 1, and thereafter, samples to which a carburizing treatment was executed were prepared, and the evaluations were conducted.

Comparative Example 13

Samples of a steel member were prepared which each had a composition containing, by mass %, C: 0.07%, Si: 0.19%, Mn: 1.28%, P: 0.015%, S: 0.025%, Cr: 1.32%, Mo: 0.34%, V: 0.23%, Al: 0.030%, N: 0.0050%, O: 0.0015%, and the balance being Fe and impurities and whose Hs value was 2.34 and Hc value was 3.60. Next, a pre-treatment and a temperature rising step of a nitriding treatment were executed under the same conditions as those of the example 1, and an iron nitride compound was formed on a surface of each of the samples by performing the nitriding treatment by the same method as in the example 1 except that, as conditions of the nitriding treatment, the temperature was set to 600° C. and the nitriding time was set to 2 h (hours), and by adjusting gas flow rates of $NH_3$ gas, $H_2$ gas, and $N_2$ gas supplied into a furnace, a ratio of a partial pressure of the $NH_3$ gas was set to 0.16 (the partial pressure of the $NH_3$ gas was set to 0.016 MPa), a ratio of a partial pressure of the $H_2$ gas was set to 0.72 (the partial pressure of the $H_2$ gas was set to 0.073 MPa), and a ratio of a partial pressure of the $N_2$ gas was set to 0.12 (the partial pressure of the $N_2$ gas was set to 0.012 MPa) when a total pressure in the furnace was defined as 1, and a gas flow velocity (wind velocity) was set to 0 to 0.5 m/s (second), and thereafter the evaluations were conducted.

[Evaluation Method]

1. Measurement of Thickness of Iron Nitride Compound Layer

The disk-shaped test pieces were cut by a cutting machine, their cross sections were polished by emery paper, and the polished surfaces were mirror-finished by a buff. After the test pieces were corroded by 3% nitric acid alcohol, the aforesaid cross sections were observed with a magnification of 400 times by using a metallurgical (optical) microscope, and the thickness of each of the iron nitride compound layers was measured. The iron nitride compound layer is also called a white layer, and it has a different structure from that of the base metal and appears white and thus can be easily visually discriminated.

2. X-ray Diffraction

By using Cu as an X-ray tube, X-ray diffraction was performed on surfaces of the disk-shaped test pieces, with voltage: 40 kV, current: 20 mA, scan angle 2θ: 20 to 80°, and scan step 1°/min.

At this time, in X-ray diffraction peak intensity $IFe_4N$ (111) of a (111) crystal plane of $Fe_4N$ appearing near 2θ:41.2 degrees and X-ray diffraction intensity $IFe_3N$ (111) of a (111) crystal plane of $Fe_3N$ appearing near 2θ:43.7 degrees, which were obtained in an X-ray diffraction profile, an intensity ratio (XRD diffraction intensity ratio) of the peak intensities expressed by $IFe_4N$ (111)/{$IFe_4N$ (111)+$IFe_3N$ (111)} was measured.

3. Peel Strength

Figure 3:
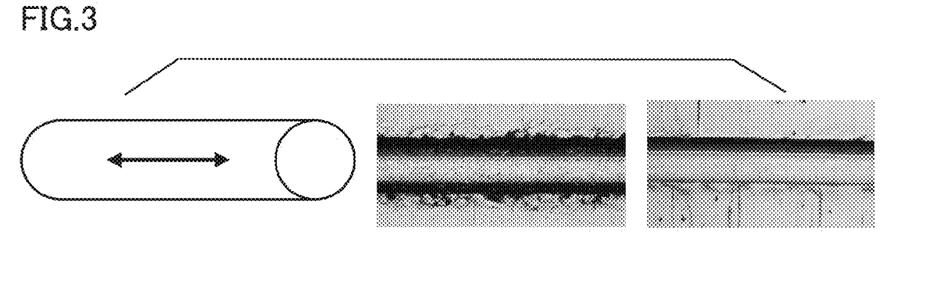
FIG. 3 is an explanatory view of a peel strength test.

For peel strength, a scratch test machine was used, a conical diamond indenter whose tip had a 100 μm radius of curvature was slid back and forth in a lubrication-free state with a load being 60 N and the number of times of reciprocation being five, and a state of peeling or breakage was observed. As illustrated in FIG. 3, as the sample for the peel test, a small roller of a roller pitting test was used and the test was conducted while the sliding was performed in an axial direction on a ϕ26 mm test portion.

The sliding in the axial direction means that the test was conducted while the sliding on a top of the shaft was performed as illustrated by the arrow in FIG. 3. The peel strength contributes to peeling resistance of a gear tooth flank and influences pitting resistance. The peeling of the gear tooth flank causes strength deterioration in accordance with the exposure of the base metal and worsens vibration and noise due to ruggedness of the gear tooth flank.

4. Roller Pitting Test

Figure 4:
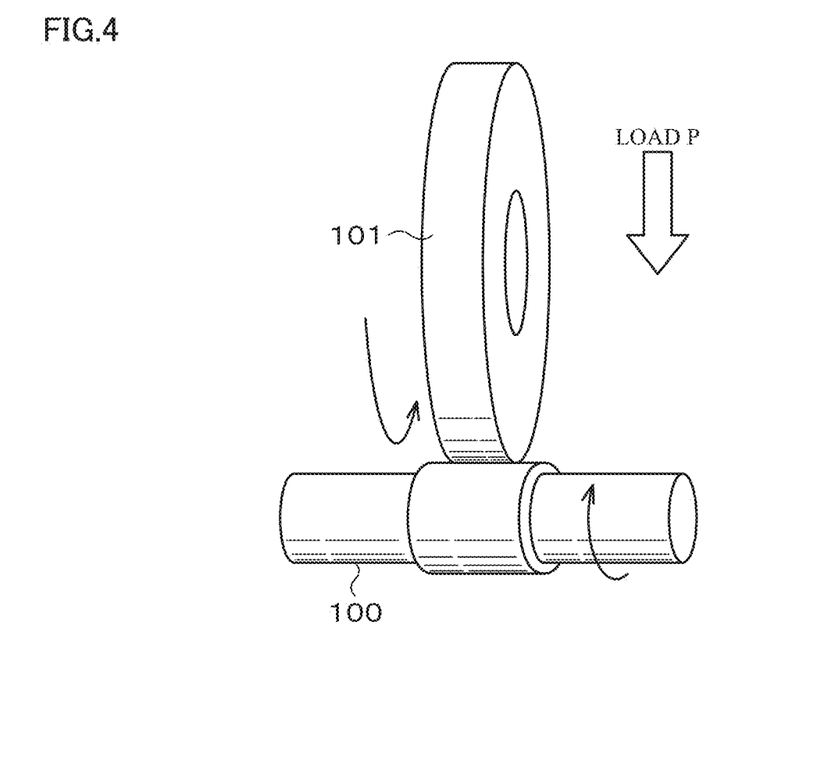
FIG. 4 is an explanatory view of a roller pitting test.

The test was conducted by using an RP201-type fatigue strength testing machine under the conditions of a slip ratio: −40%, a lubricating oil: ATF (automatic transmission fluid), lubricating oil temperature: 90° C., an amount of the lubricating oil: 0.002 $m^3$/min, and a large roller crowning: R700. As illustrated in FIG. 4, while a large roller 101 was pressed against a small roller 100 with a load P, the small roller 100 was rotated. The conditions were as follows. A rotation speed of the small roller: 1560 rpm and a contact pressure: 1800 MPa. The large and small roller pitting test pieces were made of the same material and the same nitriding treatment was applied to them.

5. Ono-Type Rotating Bending Fatigue Test

Figure 5:
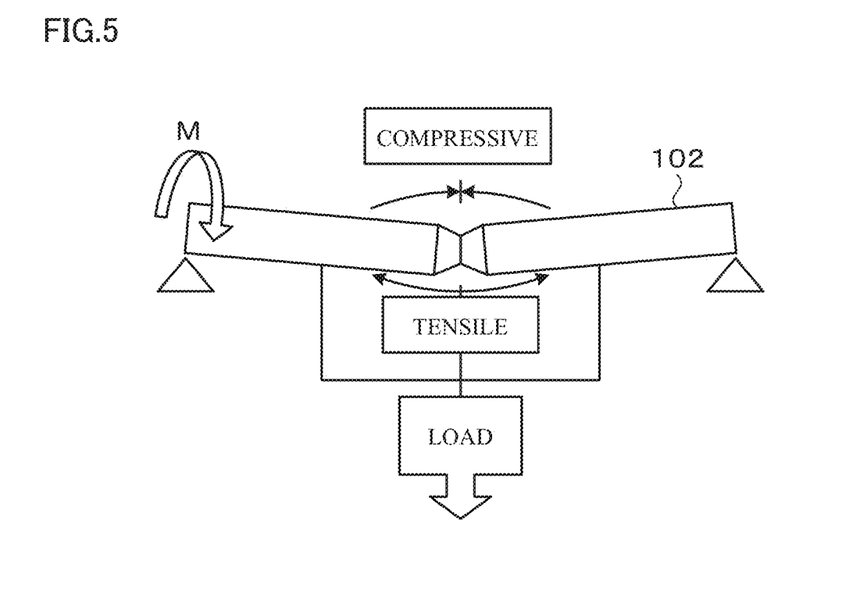
FIG. 5 is an explanatory view of an Ono-type rotating bending fatigue test.

By using an Ono-type rotating bending fatigue testing machine, the evaluation was conducted under the following test conditions. As illustrated in FIG. 5, the fatigue test was conducted by rotating a test piece 102 while applying a bending moment M, thereby repeatedly giving the test piece 102 a compressive stress on its upper side and a tensile stress on its lower side. The test conditions are as follows.
temperature: room temperature
atmosphere: in the atmosphere
rotation speed: 3500 rpm 6. Gear Strain Amount For evaluation, internal gears were fabricated by machining, whose outside diameter was ϕ120 mm, tip inside diameter was ϕ106.5 mm, gear width was 30 mm, module was 1.3, number of teeth was 78, and twist angle/pressure angle was 20 degrees, and were subjected to the aforesaid nitriding treatment or the carburizing treatment, and a change of the tooth profile was measured and evaluated. A tooth trace inclination of the tooth profile as the evaluation was used. The tooth trace inclination was measured every 90 degrees, that is, on four teeth in one gear, and the same measurement was conducted on ten gears, and the largest width was defined as variation of the tooth trace inclination.

7. Measurement Method of Vickers Hardness (1) Iron Nitride Compound Layer

The disk-shaped test pieces were each cut perpendicularly to a machined surface (front surface), their cross sections were finished by polishing, and these surfaces were used as inspection target surfaces. At the time of the cutting or the polishing, full care was taken to prevent an influence on hardness of the inspection target surfaces or prevent end portions from chipping off or becoming round.

Figure 6:
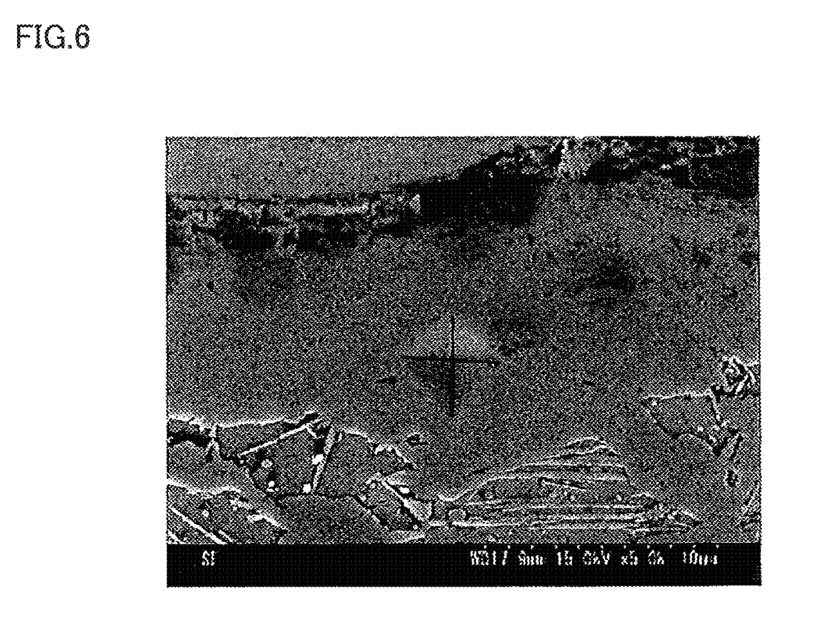
FIG. 6 is an example of SEM used for measuring Vickers hardness.

The measurement was conducted based on "Vickers hardness test and test method" described in JIS Z 2244 (2003). As a testing apparatus, a micro-hardness testing machine manufactured by Mitsutoyo was used, a test force was set to 98.07 mN (1 g), and an indentation was given to a center of the thickness of the compound layer. The indentation was observed by SEM, and it was confirmed that no crack existed near the indentation and also the size was measured to be converted to the Vickers hardness. Further, the measurement was conducted at five places and an average value was used. Incidentally, in the example 6 where the thickness of the compound layer was small (since the thickness of the compound layer was small), the indentation was formed by a 4.903 mN test load and it was observed by SEM and measured. In the present invention, when the thickness of the compound layer is 5 µm or less, the test load is set to 4.903 mN and the Vickers hardness is measured. An example of SEM used for the measurement is illustrated in FIG. 6.

(2) Base Metal Immediately Under Iron Nitride Compound Layer

In the same manner as in the measurement of the Vickers hardness of the iron nitride compound layer, the test pieces were each cut perpendicularly to a machined surface (front surface), their cross sections were finished by polishing, and these surfaces were used as inspection target surfaces. At the time of the cutting or the polishing, full care was taken to prevent an influence on hardness of the inspection target surfaces or prevent end portions from chipping or becoming round.

The measurement was conducted based on "Vickers hardness test and test method" described in JIS Z 2244 (2003). A test force was set to 1.96 N, and the measurement was conducted at a 25 µm depth in an inner direction of the base metal, with a boundary between the compound layer and the base metal being defined as 0. Further, the measurement was conducted at five places and an average value was used.

(Evaluation Result)

1. Measurement of Thickness of Iron Nitride Compound Layer

The samples for nitridation quality confirmation (disk-shape) were cut, their cross sections were observed by the microscope, and the thickness of each of the iron nitride compound layers was measured.

As for the thickness of the iron nitride compound layer in the examples, it was 10 to 12 µm in the examples 1 to 5, 3 µm in the example 6, and 16 µm in the example 7.

Further, as for the thickness of the iron nitride layer in the comparative examples, it was 9 to 13 µm in the comparative examples 1 to 9, 1 µm in the comparative example 10, and 20 µm in the comparative example 11. It was 0 to 0.5 µm in the comparative example 13.

Figure 7:
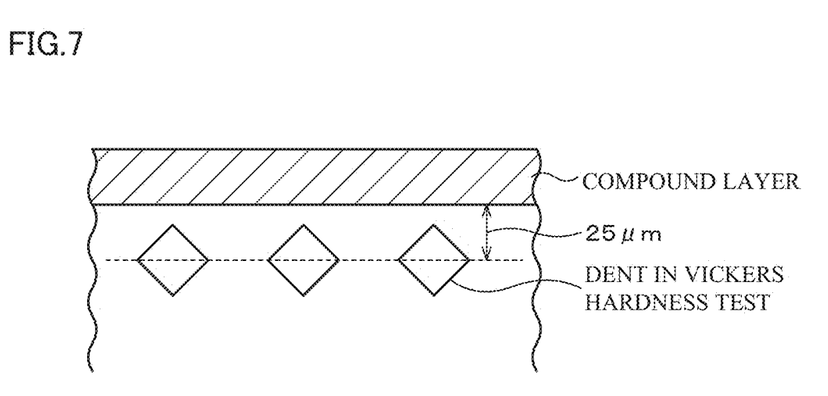
FIG. 7 is an explanatory view of the measurement of a thickness of an iron nitride compound layer.

2. Vickers Hardness of Iron Nitride Compound and Base Metal Immediately Under Iron Nitride Compound Layer As illustrated in FIG. 7, regarding the samples on which the measurement of the thickness of the iron nitride compound layer was conducted, Vickers hardness of the cross sections was measured.

In the example 1, the Vickers hardness HV was 812 in the base metal immediately under the iron nitride compound layer and 871 in the iron nitride compound layer, and a hardness difference was 59. Similarly, the Vickers hardnesses of the base metal immediately under the iron nitride compound layer, the iron nitride compound layer, and the hardness difference are as follows in order mentioned: 740, 776, and 36 in the example 2; 715, 790, and 75 in the example 3; 785, 828, and 43 in the example 4; 749, 841, and 92 in the example 5; 803, 878, and 75 in the example 6; and 798, 880, and 82 in the example 7. Similarly, the Vickers hardnesses were 690, 765, and 75 in the comparative example 1, 780, 917, and 137 in the comparative example 2, 648, 759, and 111 in the comparative example 3, 669, 766, and 97 in the comparative example 4, 748, 930, and 182 in the comparative example 5, 761, 965, and 204 in the comparative example 6, 731, 911, and 180 in the comparative example 7, 855, 1102, and 247 in the comparative example 8, 890, 1095, and 205 in the comparative example 9, and 778, 951, and 173 in the comparative example 11. Incidentally, in the comparative example 10, the Vickers hardness of the base metal immediately under the iron nitride compound layer was 781, and the Vickers hardness of the iron nitride compound layer could not be measured because the layer thickness was 1 µm and thus was thin. Further, the comparative example 12 was a carburized product and the Vickers hardness of a surface layer base metal was 745. In the comparative example 13, the Vickers hardness of the base metal immediately under the iron nitride compound layer was 813 and the Vickers hardness of the iron nitride compound layer could not be measured because the layer thickness was 0 to 0.5 µm and thus was thin 3. Analysis of Compound Layer by X-Ray Diffraction The intensity ratio of the X-ray diffraction in the examples was 0.98 or more in the example 1 to the example 7. Therefore, in any of the examples 1 to 7, the intensity ratio was 0.5 or more and thus it was determined that the iron nitride compound layer had the γ' phase as the main component.

Further, the intensity ratio of the X-ray diffraction in the comparative examples was 0.98 or more in the comparative examples 1 to 4, 0.01 in the comparative examples 5 to 9, 0.98 or more in the comparative example 10, and 0.98 or more in the comparative example 11. In the comparative example 13, it was 0.01.

4. Roller Pitting Test

As a result of the roller pitting test, in the example 1 to the example 7 and the comparative examples 1, 12, when the contact pressure was 1800 MPa, no peeling of the iron nitride compound layer on the surface of the sample was recognized even after a $1.0 \times 10^7$ cycle test, and the fatigue strength condition aimed by the present invention was cleared.

On the other hand, the samples of the comparative examples 2 to 11 suffered a defect such as damage or peeling of the sample surface before the $1.0 \times 10^7$ cycle was reached. In the comparative example 2, damage occurred after a $9.5 \times 10^6$ cycle, in the comparative example 3, damage occurred after a $6.2 \times 10^6$ cycle, and in the comparative example 4, damage occurred after a $6.8 \times 10^6$ cycle. In the comparative examples 5 to 7, peeling of the iron nitride compound occurred after a $1.0 \times 10^4$ cycle. Further, in the comparative examples 8, 9, peeling of the iron nitride compound occurred after a $1.0 \times 10^3$ cycle. Further, in the comparative example 10, damage occurred after a $4.2 \times 10^6$ cycle, and in the comparative example 11, damage occurred after a $5.5 \times 10^6$ cycle. Further, in the sample of the comparative example 12 (carburizing treatment), damage of the surface did not occur at $1.0 \times 10^7$. As described above, any of the comparative examples 2 to 11 did not satisfy the fatigue strength condition aimed by the present invention. Incidentally, as for a difference between the damage occurrence and the peeling occurrence, peeling damage of the compound layer was defined as "the peeling occurrence", and damage (pitting and spalling damage) other than the peeling of the compound layer was defined as "the damage occurrence".

Incidentally, in the comparative example 13, though it was not evaluated, since the iron nitride compound is the g-rich phase and its thickness is small, its property is thought to be equal to or poorer than that of the comparative example 10 where the iron nitride compound layer is thin 5. Ono-Type Rotating Bending Fatigue Test As a result of the rotating bending fatigue test, in the example 1, strength in the $1.0 \times 10^7$ cycle test was 520 MPa. Similarly, in the example 3, it was 440 MPa and in the example 4, it was 470 MPa. In the comparative example 7, it was 320 MPa, and in the comparative example 12, it was 430 MPa. It is obvious that the nitriding treatment according to the present invention gives high bending fatigue strength.

Incidentally, in the comparative example 13, though it was not evaluated, since the iron nitride compound is the $\epsilon$-rich phase and its thickness is small, its property is thought to be equal to or poorer than that of the comparative example 10 where the iron nitride compound layer is thin 6. Strain Amount In the gear test pieces for strain amount evaluation, a tooth trace correction amount was 4 μm (example 1), 8 μm (example 2), 5 μm (example 3), 8 μm (comparative example 5), 6 μm (comparative example 6), 7 μm (comparative example 7), and 38 μm (comparative example 12).

As compared with the comparative example 12 where the carburizing treatment was executed, the strain amount of the invention of the present application in the examples 1 to 3 was equivalent to those in the comparative examples 5 to 7 where a conventional nitriding treatment was performed, and it was confirmed that high fatigue strength and bending fatigue strength could be achieved while the strain amount was kept small.

Component compositions of the steel material types of the examples 1 to 7 and the comparative examples 1 to 12 are presented in Table 1. The temperature, treatment time, $N_2$ gas partial pressure, $NH_3$ gas partial pressure, and $H_2$ gas partial pressure which are the nitriding treatment conditions, and the state, XRD diffraction intensity ratio, and thickness of the compound layer regarding the steel material types in the examples 1 to 7 and the comparative examples 1 to 12 are collectively presented in Table 2. The properties (peel strength, roller pitting test, Ono-type rotating bending fatigue test, and so on) of the examples 1 to 7 and the comparative examples 1 to 12 turned out to be those presented in Table 3.

As a result of the scratch test, no peeling of the iron nitride compound layer was recognized in the example 1 to the example 7 and the comparative example 10, and it has become obvious that high peeling resistance is obtained by the present invention. On the other hand, in the comparative examples 1 to 4 and the comparative example 11, peeling occurred at several places, and in the comparative examples 5 to 9, peeling occurred at 10 places or more.

The peel strength contributes to peeling resistance of the gear tooth flank and influences pitting resistance. When the peel strength is low, the gear tooth flank peels off, leading to strength deterioration in accordance with the exposure of the base metal and leading to worsened vibration and noise due to ruggedness of the gear tooth flank.

[Core Hardness of Nitrided Steel Member]

As described above, in the nitrided steel member of the present invention, the Vickers hardness of the iron nitride compound layer is 900 or less and the Vickers hardness of the base metal immediately under the iron nitride compound layer is 700 or more, but when the core hardness of the nitrided steel member is low, plastic deformation occurs inside when a load is given, leading to the occurrence of tooth flank damage due to a crack occurring inside to cause the deterioration in pitting resistance. In order to suppress the plastic deformation inside the nitrided steel member, the core hardness is preferably 150 or more in terms of the Vickers hardness. Therefore, the core hardness of the nitrided steel member of the present invention is preferably 150 or more in terms of the Vickers hardness. A preferable lower limit of the core hardness is 170 in terms of the Vickers hardness. The core hardness of each of the examples and each of the comparative examples is presented in Table 4. Note that it is not necessary to particularly stipulate an upper limit of the core hardness but the upper limit in the present invention is about 350 in terms of the Vickers hardness.

TABLE 4

|  | CORE STRENGTH AFTER NITRIDING HV |
|---|---|
| EXAMPLE 1 | 262 |
| EXAMPLE 2 | 198 |
| EXAMPLE 3 | 162 |
| EXAMPLE 4 | 190 |
| EXAMPLE 5 | 209 |
| EXAMPLE 6 | 265 |
| EXAMPLE 7 | 260 |
| COMPARATIVE EXAMPLE 1 | 248 |
| COMPARATIVE EXAMPLE 2 | 312 |
| COMPARATIVE EXAMPLE 3 | 182 |
| COMPARATIVE EXAMPLE 4 | 192 |
| COMPARATIVE EXAMPLE 5 | 263 |
| COMPARATIVE EXAMPLE 6 | 209 |
| COMPARATIVE EXAMPLE 7 | 189 |
| COMPARATIVE EXAMPLE 8 | 260 |
| COMPARATIVE EXAMPLE 9 | 270 |
| COMPARATIVE EXAMPLE 10 | 192 |
| COMPARATIVE EXAMPLE 11 | 190 |
| COMPARATIVE EXAMPLE 13 | 189 |

INDUSTRIAL APPLICABILITY

The present invention is useful for a nitriding technique of steel.

EXPLANATION OF REFERENCE SIGNS 1 heat treatment apparatus
10 loading part 11 heating chamber
12 cooling chamber
13 unloading conveyor
20 case
21 door
22 entrance hood
26 fan
30 elevator
31 oil
32 oil tank
35 door
36 exit hood
100 small roller
101 large roller
102 test piece

The invention claimed is:

1. A nitrided steel member comprising an iron nitride compound layer formed on a surface of a base metal
which contains, by mass %, C: 0.05 to 0.14%, Si: 0.10 to 0.30%, Mn: 0.4 to 1.4%, Cr: 0.9 to 1.9%, Mo: 0 to 0.50%, V: 0 to 0.40%, Al: 0.01 to 0.14%, and S: 0.005 to 0.030%,
whose Hs value expressed by the following expression 1 is 1.19 or more, $Hs$ value=$(-342.1 \times C + 23.5 \times Mn + 125.0 \times Cr + 14.4 \times Mo + 208.3 \times V + 346.4 \times Al)/100$   expression 1, whose Hc value expressed by the following expression 2 is 3.76 or less, $Hc$ value=$(156.1 \times C + 54.7 \times Mn + 158.4 \times Cr + 146.5 \times Mo + 33.8 \times V + 418.6 \times Al)/100$   expression 2, where C, Mn, Cr, Mo, V, and Al represent values of mass % of the respective elements, and
in which the balance is made of Fe and impurities, with P, N, and O in the impurities being P: 0.030% or less, N: 0.008% or less, and O: 0.0030% or less,
wherein, in X-ray diffraction peak intensity $IFe_4N$ (111) of a (111) crystal plane of $Fe_4N$ and X-ray diffraction peak intensity $IFe_3N$ (111) of a (111) crystal plane of $Fe_3N$, which are measured on the surface of the nitrided steel member by X-ray diffraction, an intensity ratio expressed by $IFe_4N$ (111)/{$IFe_4N$ (111)+$IFe_3N$ (111)} is 0.5 or more,
wherein Vickers hardness of the iron nitride compound layer is 900 or less, Vickers hardness of the base metal immediately under the iron nitride compound layer is 700 or more, and a difference between the Vickers hardness of the iron nitride compound layer and the Vickers hardness of the base metal is 150 or less, and
wherein a thickness of the iron nitride compound layer is 2 to 17 μm.

2. The nitrided steel member according to claim 1, being a gear used in a transmission.

3. A manufacturing method of a nitrided steel member, the method comprising applying a nitriding treatment to a base metal in an atmosphere of nitriding treatment gas in which a ratio of a partial pressure of $NH_3$ gas is 0.08 to 0.34, a ratio of a partial pressure of $H_2$ gas is 0.54 to 0.82, and a ratio of a partial pressure of $N_2$ gas is 0.09 to 0.18 when a total pressure is defined as 1, with a flow velocity of the nitriding treatment gas on a surface of the base metal being set to 1 m/s or more, and with a temperature being set to 500 to 620° C., to thereby form an iron nitride compound layer with a 2 to 17 μm thickness on the surface of the base metal,
the steel member being a member
which contains, by mass %, C: 0.05 to 0.14%, Si: 0.10 to 0.30%, Mn: 0.4 to 1.4%, Cr: 0.9 to 1.9%, Mo: 0 to 0.50%, V: 0 to 0.40%, Al: 0.01 to 0.14%, and S: 0.005 to 0.030%,
whose Hs value expressed by the following expression 1 is 1.19 or more, $Hs$ value=$(-342.1 \times C + 23.5 \times Mn + 125.0 \times Cr + 14.4 \times Mo + 208.3 \times V + 346.4 \times Al)/100$   expression 1, whose Hc value expressed by the following expression 2 is 3.76 or less, $Hc$ value=$(156.1 \times C + 54.7 \times Mn + 158.4 \times Cr + 146.5 \times Mo + 33.8 \times V + 418.6 \times Al)/100$   expression 2, where C, Mn, Cr, Mo, V, and Al represent values of mass % of the respective elements, and
in which the balance is made of Fe and impurities, with P, N, and O in the impurities being P: 0.030% or less, N: 0.008% or less, and O: 0.0030% or less.

4. The manufacturing method of the nitrided steel member according to claim 3, wherein a time of the nitriding treatment is within a range over 0.5 hours and less than ten hours.

* * * * *